US009308838B2

(12) United States Patent
Miller et al.

(10) Patent No.: US 9,308,838 B2
(45) Date of Patent: Apr. 12, 2016

(54) CENTER-PULL LATCH MECHANISM

(71) Applicant: BRITAX CHILD SAFETY, INC., Fort Mill, SC (US)

(72) Inventors: Brandon Miller, Charlotte, NC (US); Brian Allen, Fort Mill, SC (US); Grant Mason, Indian Land, SC (US); William Doolan, Clover, SC (US); Michael Starkey, Charlotte, NC (US)

(73) Assignee: BRITAX CHILD SAFETY, INC., Fort Mill, SC (US)

( * ) Notice: Subject to any disclaimer, the term of this patent is extended or adjusted under 35 U.S.C. 154(b) by 0 days.

(21) Appl. No.: 14/481,476

(22) Filed: Sep. 9, 2014

(65) Prior Publication Data

US 2016/0068083 A1  Mar. 10, 2016

(51) Int. Cl.
*B60N 2/28* (2006.01)
*B60N 2/42* (2006.01)

(52) U.S. Cl.
CPC ............ *B60N 2/2806* (2013.01); *B60N 2/2821* (2013.01)

(58) Field of Classification Search
CPC .. B60N 2/2821; B60N 2/2824; B60N 2/2845; B60N 2/2887
USPC ............................................ 297/253, 256.16
See application file for complete search history.

(56) References Cited

U.S. PATENT DOCUMENTS

| 7,488,034 | B2 * | 2/2009 | Ohren et al. ............. 297/256.16 |
| 8,056,975 | B2 | 11/2011 | Longenecker et al. |
| 8,256,840 | B2 * | 9/2012 | Dasent et al. ................. 297/253 |
| 8,262,161 | B2 * | 9/2012 | Fritz et al. ...................... 297/253 |
| 8,444,222 | B2 * | 5/2013 | Buckingham et al. ......... 297/253 |
| 8,550,555 | B2 * | 10/2013 | Fritz et al. ...................... 297/253 |
| 8,789,886 | B2 * | 7/2014 | Mason et al. .................. 297/253 |
| 8,827,364 | B2 * | 9/2014 | Banghart et al. ............... 297/253 |
| 8,833,854 | B2 * | 9/2014 | Lu et al. ......................... 297/253 |
| 8,973,991 | B2 * | 3/2015 | Wuerstl ......................... 297/253 |
| 2011/0140491 | A1 * | 6/2011 | Williams et al. ......... 297/256.16 |
| 2013/0119732 | A1 * | 5/2013 | Wuerstl ......................... 297/253 |
| 2013/0127218 | A1 * | 5/2013 | Carpenter et al. ............ 297/253 |
| 2015/0183341 | A1 * | 7/2015 | Carpenter ................ 297/256.16 |

* cited by examiner

*Primary Examiner* — Rodney B White
(74) *Attorney, Agent, or Firm* — Nelson Mullins Riley & Scarborough LLP

(57) ABSTRACT

A base for a safety seat and method for manufacturing the same are provided. The base may have a shell defining a cavity therein with a locking assembly disposed within the cavity. The base may further include one or more straps having a first end and a second end extending through the locking assembly releasably engaging the straps with the first and second ends being disposed on opposing sides of the locking assembly. The straps may define a first portion extending from a connector to the locking assembly and a second portion extending from the locking assembly to the second ends. A tensioning assembly may be provided to apply a tension to the second portions. The one or more straps may include two straps configured to be accessed by a user parallel to a centerline of the base.

18 Claims, 7 Drawing Sheets

CENTER-PULL LATCH MECHANISM

BACKGROUND

The present invention is directed to an improved system and apparatus for securing a safety seat assembly to a vehicle. In particular, the present invention relates to a restraint system for securing a base of a safety seat to a vehicle seat.

Conventional safety seats, such as car seats or infant carriers having accompanying bases may be designed to attach to a vehicle seat. Typically, safety seats may be attached to the vehicle seats using either a vehicle safety belt or straps with connectors configured to engage the vehicle seat anchors. With these existing systems, however, users often have trouble accessing the attachment devices to apply sufficient tension to securely hold the safety seat to the vehicle seat, and often the straps or belts holding the safety seat in place will interfere with the attachment of the safety seat to the vehicle or an accompanying base.

Through applied effort, ingenuity, and innovation, many of these identified problems have been solved by developing solutions that are included in embodiments of the present invention, many examples of which are described in detail herein.

SUMMARY OF THE INVENTION

In order to solve the problems detailed above, and provide further benefits over existing safety seats, embodiments of the present invention include various apparatus and methods directed to a center-pull LATCH mechanism.

In some embodiments, a base for a safety seat may be provided that is configured to be anchored to a vehicle seat. In some embodiments, the base may include a shell defining a cavity therein. A locking assembly may be disposed within the cavity. One or more straps may be included that may define a first end and a second end, wherein the one or more straps may extend through the locking assembly. In some embodiments, the locking assembly may be configured to releasably engage the one or more straps to secure the safety seat to the vehicle seat. The first end and the second end of each of the one or more straps may be configured to be disposed on opposing sides of the locking assembly. A connector may be provided that may be attached to the first end of each the one or more straps. Each of the one or more straps may define a first portion extending from the connector to the locking assembly, and the connectors may be configured to engage a vehicle seat. A tensioning assembly may be provided that is supported by the shell. The tensioning assembly may be configured to apply a tension to a second portion of each of the one or more straps, and the second portion may extend from the locking assembly to the second end of the one or more straps.

In some embodiments, a window may be defined by an upper surface of the shell of the base such that the second portions of the one or more straps may be at least partially accessible via the window. The window may be configured to present a predetermined length of the second portions of the one or more straps for access by a user. Accessing the second portions of the one or more straps may be configured to increase the tension in the first portions of the one or more straps to further secure the base to the vehicle, and the tensioning assembly may be configured to reduce slack in the second portions of the one or more straps.

In some embodiments, the one or more straps may comprise a first strap and a second strap. The locking assembly may be configured to receive a first portion of the first strap and a first portion of the second strap from opposing sides of the base, and a second portion of the first strap and a second portion of the second strap may be disposed parallel to a centerline of the base. In some embodiments, the second end of at least one of the second portions may be fixedly attached within the base such that the tensioning assembly may apply a tension to an intermediate portion of the at least one second portion.

In some embodiments, the locking assembly may define one or more releasable, one-way locks configured to allow the one or more straps to be pulled through the locking assembly in a tensioning direction. Each of the one or more releasable, one-way locks may comprise at least two locks configured to be actuated substantially simultaneously by a common actuator plate. In some embodiments, the locking assembly may further comprise a rigid support plate, and the rigid support plate may be configured to engage the shell of the base.

In some embodiments, the tensioning assembly may comprise one or more elastic straps.

In some alternative embodiments, a base for a safety seat may be provided that is configured to be anchored to a vehicle seat. The base may include a shell defining a cavity therein, and may include a locking assembly disposed within the cavity. One or more straps may be included that may define a first end and a second end. The one or more straps may extend through the locking assembly. The locking assembly may be configured to releasably engage the one or more straps to secure the safety seat to the vehicle seat. The first end and the second end of each of the one or more straps may be configured to be disposed on opposing sides of the locking assembly. A connector may be attached to the first end of each of the one or more straps, and each of the one or more straps may define a first portion extending from the connector to the locking assembly. The connectors may be configured to engage a vehicle seat. In some embodiments, the one or more straps may comprise a first strap and a second strap. The locking assembly may be configured to receive a first portion of the first strap and a first portion of the second strap from opposing sides of the base. A second portion of the first strap and a second portion of the second strap may extend from the locking assembly to the second ends of the first and second strap and may be disposed parallel to a centerline of the base.

A window may be defined by an upper surface of the shell of the base such that the second portions of the first strap and the second strap may be at least partially accessible via the window. The window may be configured to present a predetermined length of the second portions of first strap for access by a user. A tensioning assembly may be provided that may be supported by the shell. The tensioning assembly may be configured to apply a tension to the second portion of the first strap and the second portion of the second strap.

In yet another embodiment, a method of manufacturing a base for a safety seat is provided. The method may comprise providing a shell having a cavity defined therein. Some embodiments of the method may include connecting a locking assembly to the shell within the cavity. The method may further include extending one or more straps defining a first end and a second end through the locking assembly. In some embodiments the locking assembly may be releasably engaged with the one or more straps, and the first end and the second end of each of the one or more straps may be configured to be disposed on opposing sides of the locking assembly.

Some embodiments of the method include attaching a connector to the first end of each of the one or more straps. Each of the one or more straps may define a first portion extending from the connector to the locking assembly. The connectors may be configured to engage a vehicle seat. The method may include attaching a tensioning assembly to second portions of each of the one or more straps. The second portion may extend from the locking assembly to the second end of the one or more straps, and the tensioning assembly may be configured to apply a tension to the second portions of each of the one or more straps.

Some embodiments of the method may include disposing the one or more straps through one or more slots in the shell into a window defined by an upper surface of the shell of the base such that the second portions of the one or more straps may be at least partially accessible via the window. In some embodiments, the tensioning assembly may include at least one elastic strap. Attaching the tensioning assembly may further comprise connecting a first end of the at least one elastic strap to an intermediate portion of the second portion of the one or more straps such that the tensioning assembly may be configured to apply a tension to the intermediate portion of the second portion of the one or more straps. Attaching the tensioning assembly may further comprise connecting a second end of the at least one elastic strap to the base such that the second end may be fixed relative to the base.

In some embodiments, the second end of at least one of the one or more straps may be fixedly attached within the base.

In some embodiments, the locking assembly may further comprise a rigid support plate such that connecting the locking assembly to the shell may further comprise connecting the rigid support plate to the shell within the cavity.

DETAILED DESCRIPTION

The present invention will now be described more fully hereinafter with reference to the accompanying drawings, in which some, but not all embodiments of the present invention are shown. Indeed, the present invention may be embodied in many different forms and should not be construed as limited to the embodiments set forth herein; rather, these embodiments are provided so that this disclosure will satisfy applicable legal requirements. As used herein, terms such as "front," "back," "left," "right," "top," "bottom," "upper," or "lower" are included for example purposes to show only a relative location of certain features and should not be construed to limit the scope of the invention to a single direction. Like numbers refer to like elements throughout.

Typically, safety seats are attached to vehicle seats using either the vehicle's safety belt or dedicated Lower Anchors and Tethers for Children (LATCH) anchors. Also known as ISO 13216, ISOFIX, LUAS, or CANFIX, the LATCH system is a set of attachment points for child safety seats that must be installed in all new cars sold in the United States after September 2002.

Safety seats may engage the LATCH attachment points with one or more connectors, such as hooks or clips, in order to secure the safety seat to the vehicle seat. The connectors may attach to the base of the safety seat with one or more straps. The straps are tightened by pulling on a loose end of the strap to apply tension to the straps and hold the base in position. Some safety seats may join the ends of several straps to apply tension to more than one strap at once.

Once tightened, however, the loose ends of the straps may be left lying across the seat base or may require the user to manually move the straps out of the way. The loose ends of the straps may cause interference with the engagement of a safety seat to its separate base, and improper engagement of the safety seat with its base may cause the safety seat to decouple from the base during a crash. It may also be difficult to tighten the straps in such cases because the straps require the user to pull at odd or obstructed angles, thus presenting a risk that the safety seat may be dangerously loose.

Figure 1:
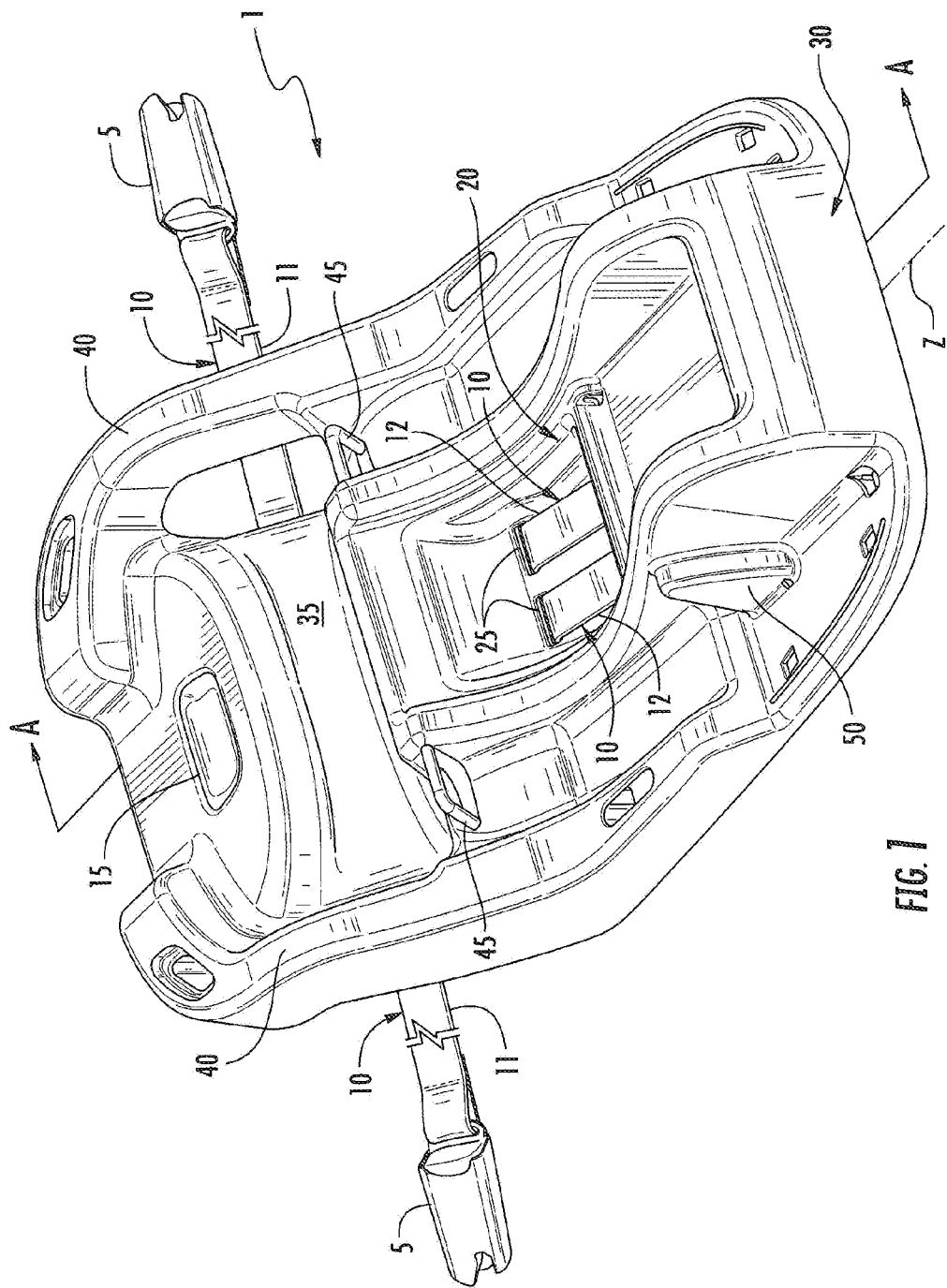
FIG. 1 shows a perspective view of a base of a safety seat in accordance with an embodiment of the present invention.

FIG. 1 depicts an embodiment of a base 1 of a safety seat in accordance with an embodiment of the present invention. The base 1 may have one or more connectors 5 attached via corresponding straps 10. In the embodiments discussed herein, the straps 10 may be any type of connecting member, including but not limited to cables, webbings, strings, ropes, or tethers. The connectors 5 may be attached to first ends of the straps 10 and may be used to secure the base 1 of the safety seat to a vehicle seat using the LATCH attachment points (not pictured) in the vehicle seat. One or more release buttons 15 may also be provided to allow the straps 10 to be loosened or adjusted in the loosening direction. In some embodiments of the present invention, the shell 30 covers only an upper area of the base 1; however, alternative embodiments may also provide a shell over the bottom, such that the various internal components of the base are inaccessible from the exterior.

Figure 2:
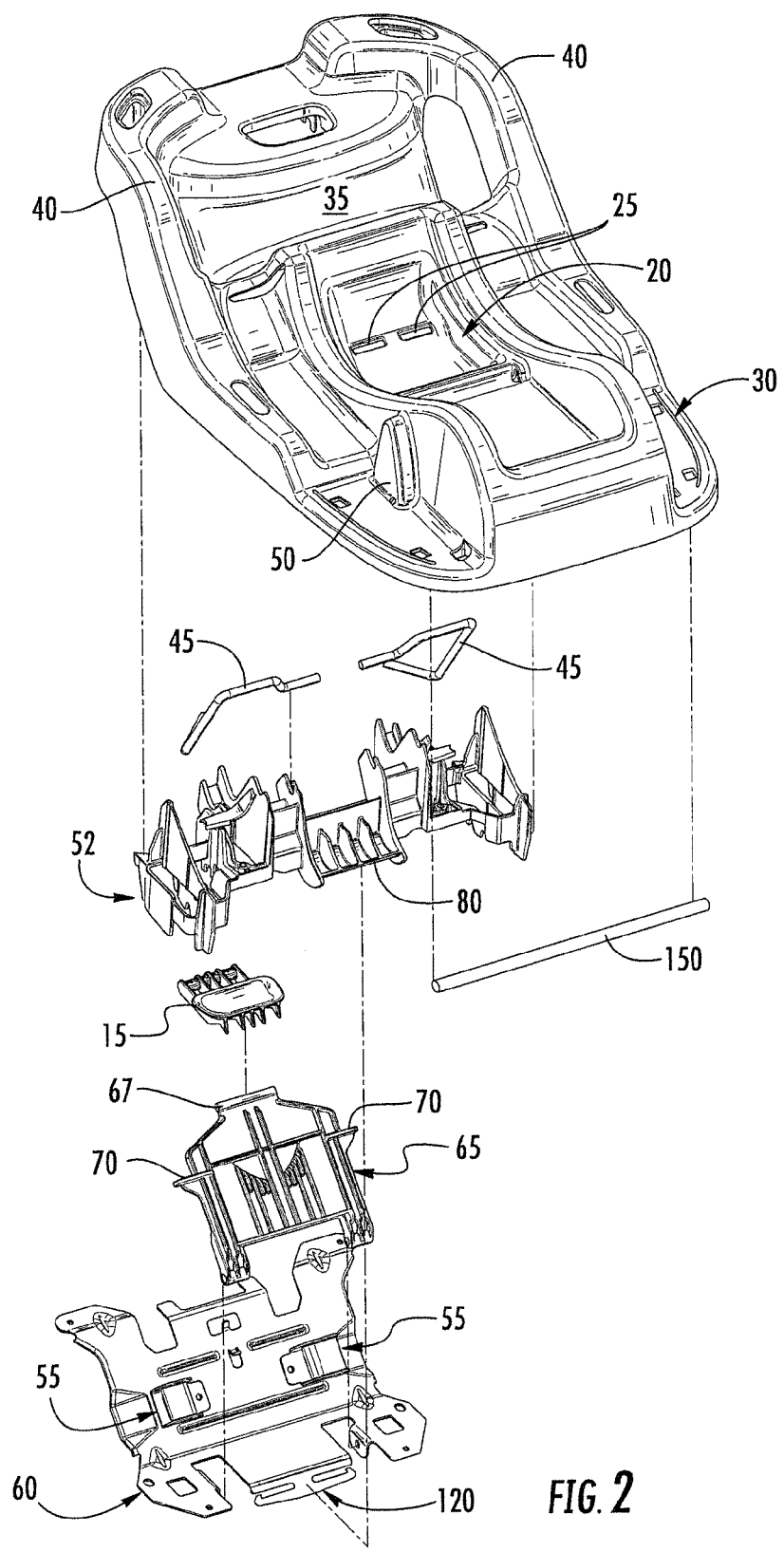
FIG. 2 shows an exploded view of the base of the safety seat of FIG. 1 in accordance with an embodiment of the present invention.

With reference to FIG. 2, an exploded view is shown of the base 1 of FIG. 1. The shell 30 may contain an internal cavity in which one or more of the components of the base 1 may be disposed. In some embodiments, the base 1 may include a locking assembly 51 that includes an actuator plate 65 and a rigid support plate 60 with one or more locking clips 55 configured to engage the straps. The base 1 may also include a support and routing assembly 52, which is configured to support the structure of the base as well as to at least partially engage the anchors 45 and provide routing surfaces 80 for the straps. In some embodiments, a rod 150 may be provided to facilitate operation of the tensioning assembly, as explained in further detail below.

Again referring to FIG. 1, in some embodiments, a safety seat (not shown) may be removably connected to the vehicle seat by the separate base 1. In these embodiments, the safety seat may be connected to the base at one or more attachment points. The attachment points may either hold or bias the safety seat in a secure position, such that the safety seat is fixed to the base 1. In some embodiments, the base 1 may have a pair of anchors 45 that are engaged by corresponding hooks or clips on the safety seat. The base 1 may also have a pair of protrusions 50 that further bias the safety seat into an aligned position, such that the anchors 45 and protrusions 50 serve as the attachment points.

In some alternative embodiments, the base may be an integral portion of the safety seat forming a single, unitary safety seat such that the safety seat may be attached to the vehicle seat as a single assembly. In these embodiments, the methods and apparatus for attaching and tensioning the base of the safety seat, described herein, may also be applicable to the unitary safety seat.

With respect to the depicted embodiments, the base of the safety seat may additionally or alternatively define a vehicle safety belt receiving groove 35 that allows the vehicle safety belt to be used to secure the safety seat to the vehicle seat. The shell 30 of the safety seat may be structured to allow the vehicle safety belt to travel under one or more arms 40 of the shell, over the groove 35 and under a corresponding arm on the opposite side of the shell. The vehicle safety belt may be used when the vehicle is not configured with LATCH anchors.

Figure 3:
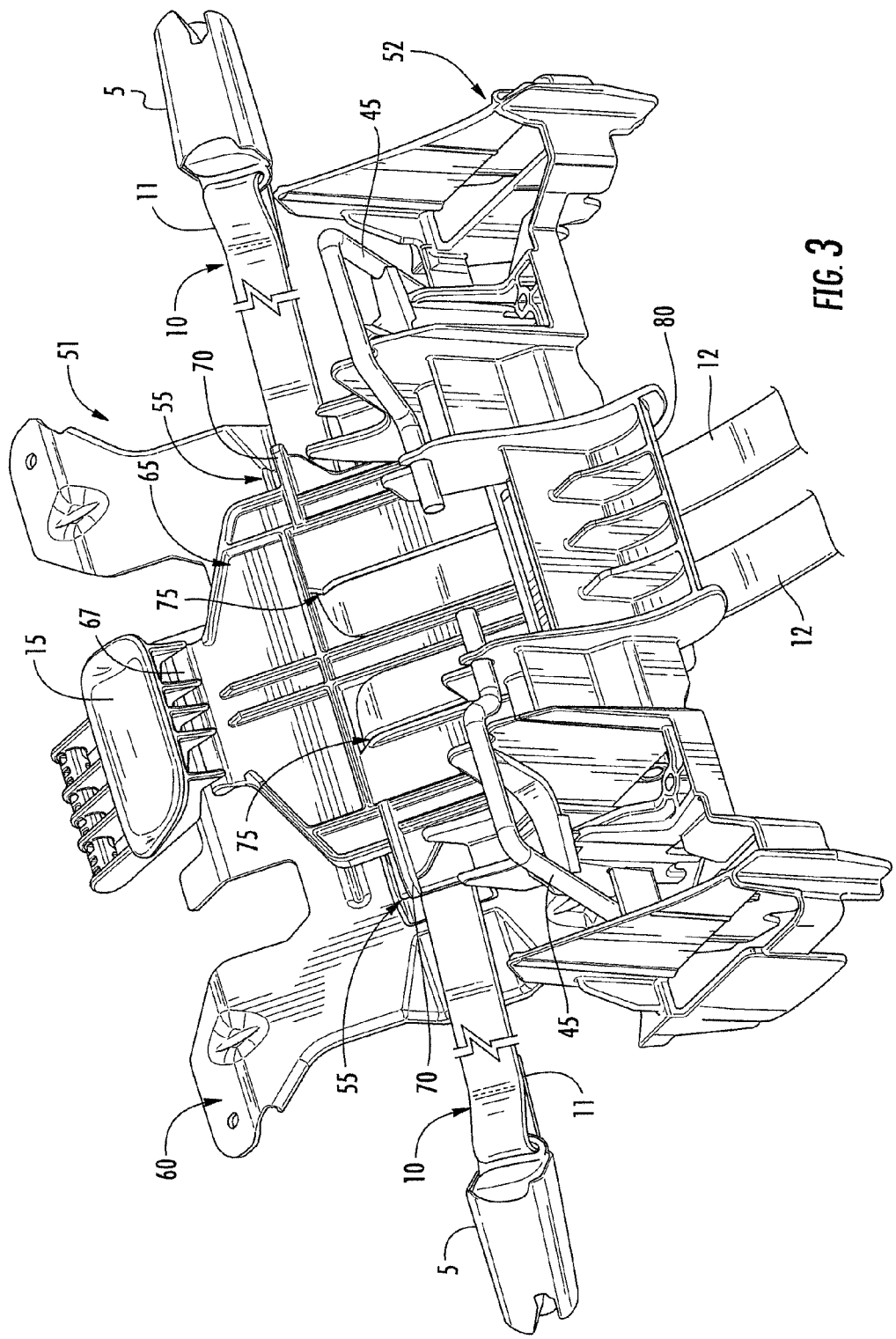
FIG. 3 shows a partial view of a locking assembly and a support and routing assembly of a base of a safety seat in accordance with an embodiment of the present invention.

With reference to FIG. 3, the locking assembly 51 in accordance with some embodiments of the present invention is shown connected to a support and routing assembly 52 within the base 1 of the safety seat. The locking assembly 51 may be disposed within the shell 30 of the base to maintain tension on the straps 10. The locking assembly 51 may help a user apply tension by allowing one-way movement of the straps 10 through the assembly to increase the tension (e.g., in a "tensioning direction") without inadvertently releasing the straps (e.g., in a "loosening direction"). In some embodiments, the locking assembly 51 may include one or more buttons 15, the actuator plate 65, and one or more locking clips 55. The straps 10 may be pulled in a one-way tensioning direction through the locking assembly 51 so that tension may be added. In the loosening direction, however, the user may be required to actuate the locking assembly to release the tension. Such a system may ease adjustment of the base 1 by allowing the base to be secured by easily applying tension to the straps 10, while making it difficult to inadvertently release or add slack to the straps (e.g., because the button 15 must be actuated). In alternative embodiments, the locking assembly 51 may fixedly hold the straps in both directions until released (e.g., by a lever or button press).

The locking assembly 51 may divide the straps into first portions 11 and second portions 12. The first portion 11 of the strap 10 may be defined as the portion of the strap on the same side of the locking assembly 51 as the LATCH connectors 5 that is configured to be placed in tension when the base 1 is attached to the vehicle seat, whether or not the first portion 11 of the straps 10 is in tension at a particular time. The first portion 11 of the straps 10 may extend from the connectors 5 attached to the first end of the straps to the locking assembly. The second portion 12 of the straps 10 may be defined as the portion of the strap on the opposite side of the locking assembly 51 from the LATCH connectors 5 extending from the locking assembly to the second end 13 of the straps 10.

Figure 4:
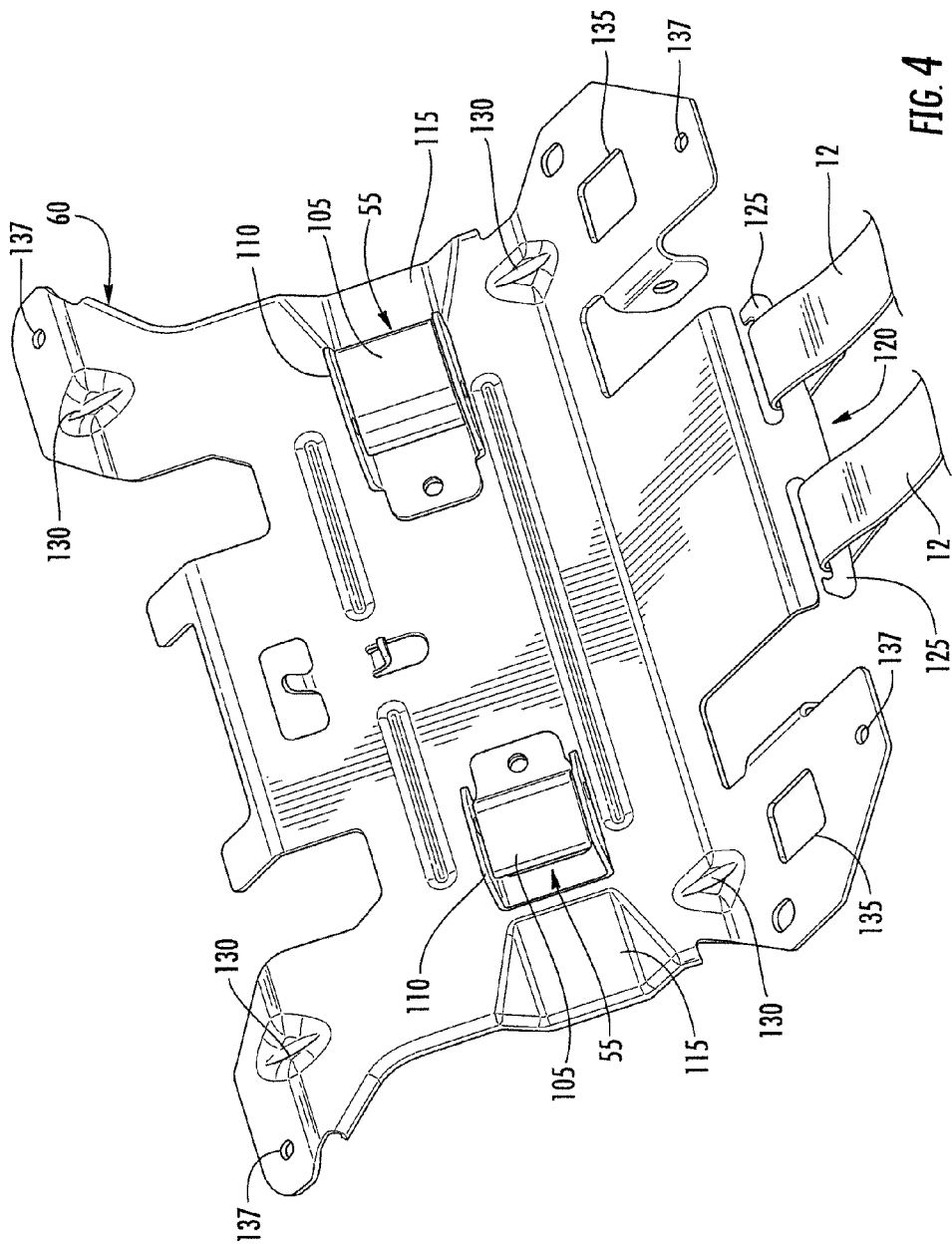
FIG. 4 shows a perspective view of a plate and a pair of locking clips in accordance with an embodiment of the present invention.

With reference to FIG. 4, the locking clips 55 of the locking assembly 51 may be A-clips or similar attachment devices. In the embodiment shown in FIG. 4, the locking clips 55 include a frame 110 and a locking tab 105. The straps 10 feed through the locking clips 55 between the frame 110 and the locking tab 105 and are pinched between the two pieces. In some embodiments, a spring may be provided within the clips 55 to apply torque to the locking tab 105 and pinch down on the straps 10. In the embodiment shown in FIG. 4, the straps may move substantially freely within the clips 55 with limited or no resistance towards the center of the support plate 60 in order to allow tension to be applied, but the locking tabs 105 may pinch down on the straps if they are pulled away from the center of the plate, such that the tension remains in the first portion 11 of the straps after tightening. In some embodiments, the straps may be joined or overlapped before passing through the locking assembly 51, in which case only a single clip may be used.

Figure 5:
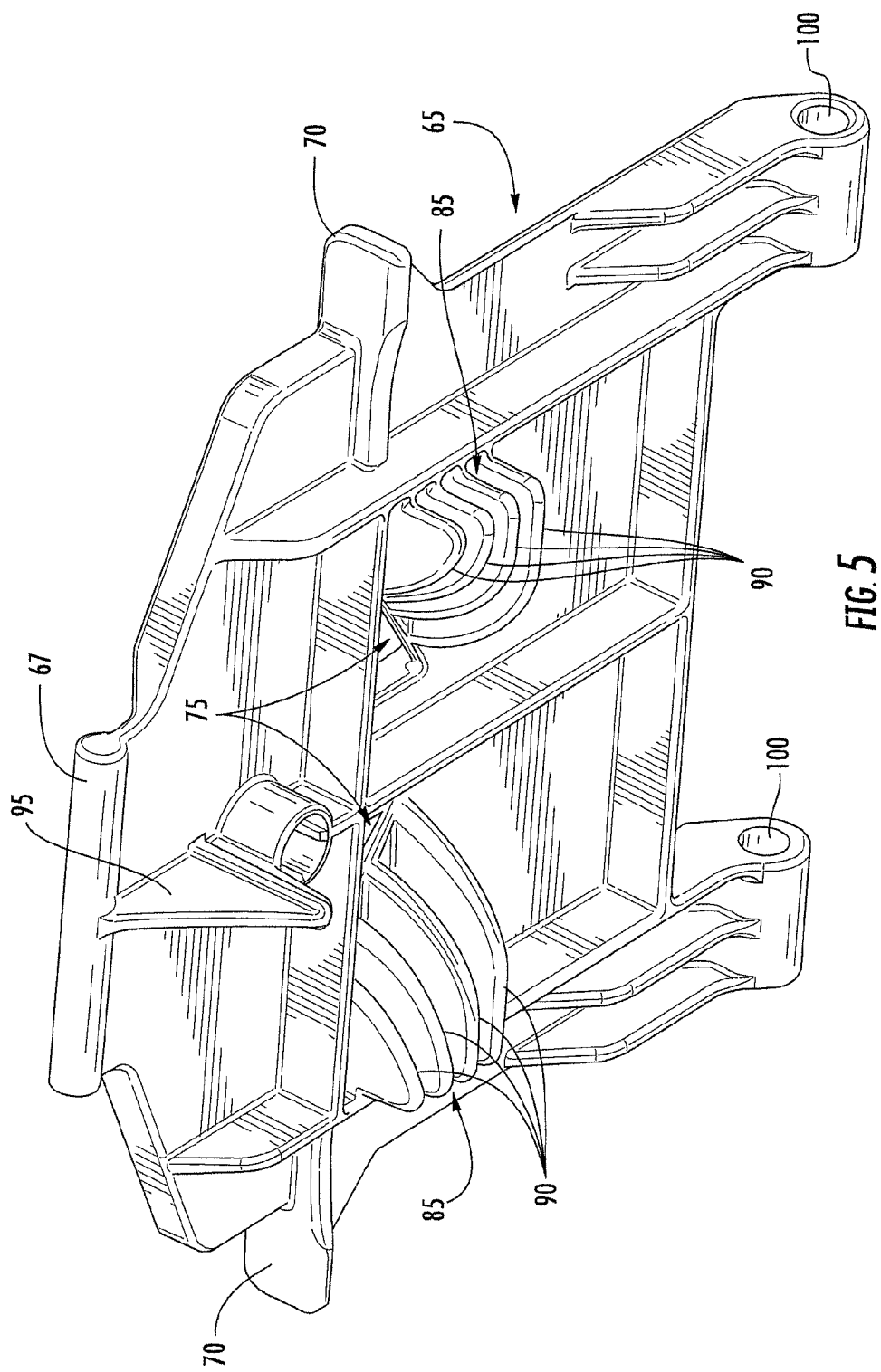
FIG. 5 shows an actuator plate in accordance with an embodiment of the present invention.

With reference to FIG. 5, the clips 55 (shown in FIG. 4) may be actuated by an actuator plate 65. The actuator plate 65 may engage each clip 55 with an arm 70 such that pressing the actuator plate 65 causes both locking tabs 105 (shown in FIG. 4) to be actuated to release the straps. The button 15 (shown in FIG. 3) may be accessible from the exterior of the base 1 and may be configured to engage the actuator plate 65 at a point 67 on the upper end of the plate. The actuator plate 65 may have one or more hinges 100 configured to attach to the support plate 60 of FIG. 4 to allow the actuator plate to pivot about the hinges. The actuator plate 65 may include a post 95 to limit the plate's range of motion to a predefined range to allow for consistent movement of the plate to actuate the clips 55. In some alternative embodiments, a single button 15 may actuate multiple locking clips 55, either directly or indirectly, or there may be a button provided for separately actuating each of the respective clips.

As discussed above, the locking assembly 51 may be configured to bend the straps 10 along a centerline Z of the base 1 in order to locate the straps in an accessible portion of the base. With reference to FIGS. 3 and 5, the actuator plate 65 may have one or more routing channels 75 that allow the straps to bend at approximately ninety degrees in order to run parallel along the centerline Z of the base 1. The routing channels 75 may be angled at approximately forty-five degrees relative to the centerline Z, so that the straps bend smoothly about the channels. In some embodiments, with reference to FIG. 5, the actuator plate 65 may include a routing structure 85 that may include one or more struts 90 arranged to smoothly redirect the straps 10. The struts 90 may be positioned on the front and/or back side of the actuator plate 65 proximate the routing channels 75, for example, as shown in FIG. 5. In some embodiments, the routing channels 75 may be connected as a single opening. Additionally or alternatively, the straps 10 may overlap or join one another at the routing channel so that only a single channel is needed.

Figure 6:
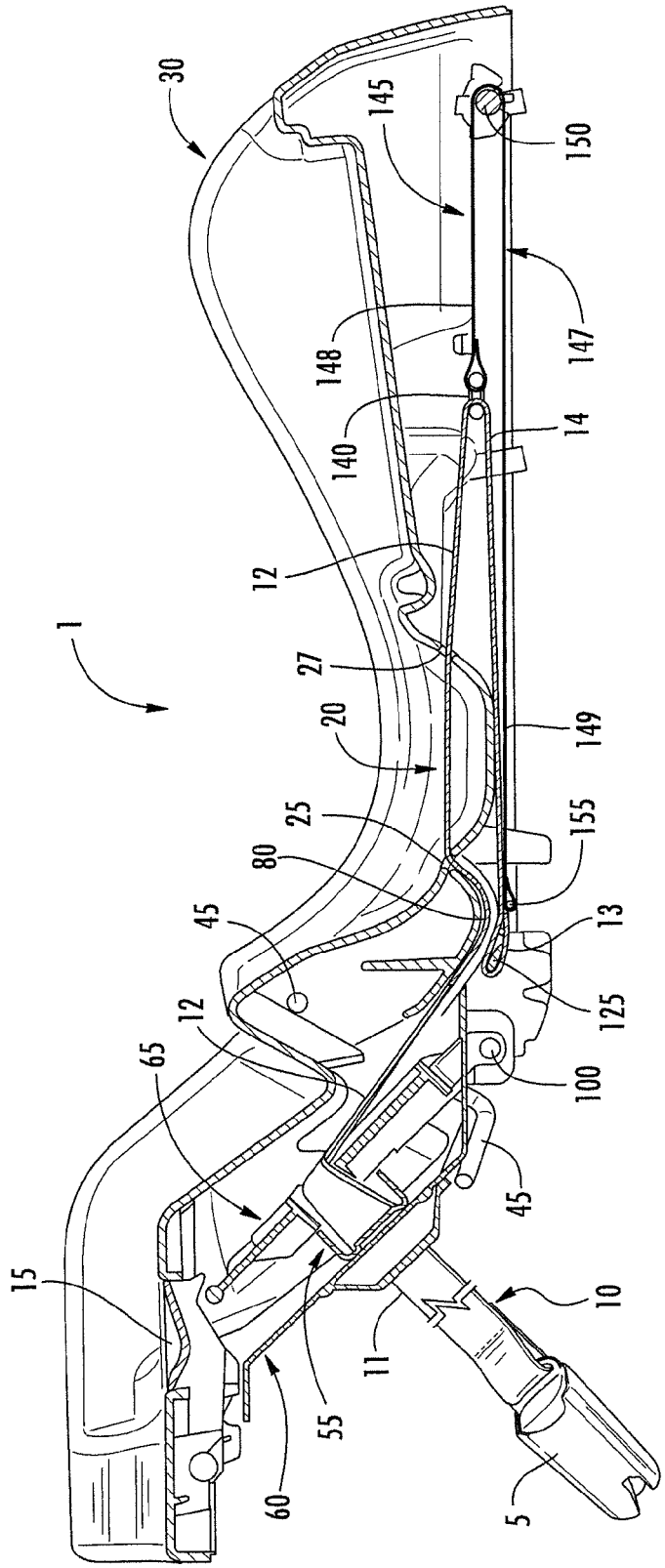
FIG. 6 shows a cross-sectional view of the base of the safety seat shown in FIG. 1 taken in the A-A plane in the direction of the reference arrows.
Figure 7:
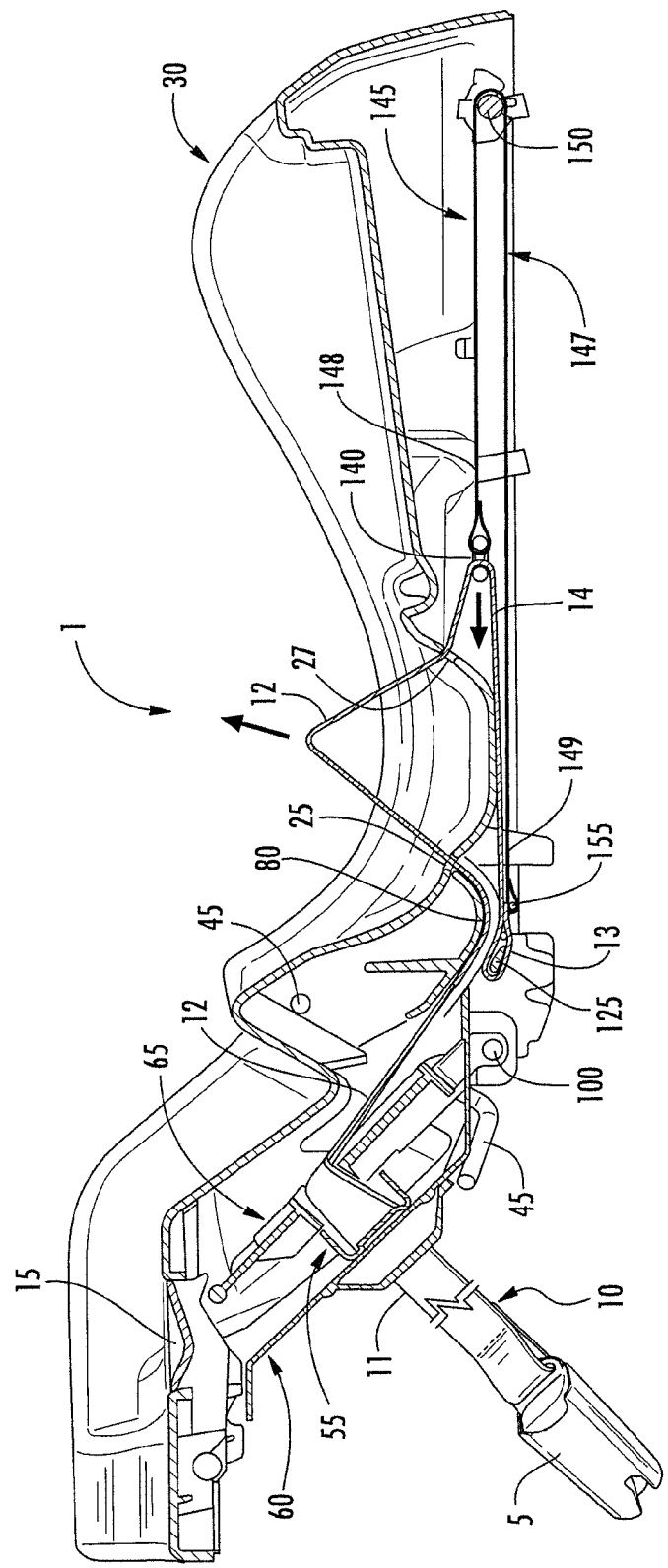
FIG. 7 shows the cross-sectional view of the base of the safety seat shown in FIG. 6 with the strap being pulled.

With reference to FIGS. 3, 6, and 7, the support and routing assembly 52 may be configured to guide the straps 10 through the base 1 and to support the structure of the base. The support and routing assembly 52 may engage the anchors 45 of the base 1 that engage the safety seat. In some embodiments, the anchors 45 may be additionally or alternatively connected to the support plate 60. In some embodiments, after the straps 10 pass through the actuator plate 65, they may be directed under a guide 80 of the support and routing assembly 52.

FIGS. 6 and 7 depict a cross-sectional view of the base 1 of FIG. 1 taken along the second portions 12 of the straps. The cross-sectional views of FIGS. 6 and 7 are offset from the centerline Z in the plane A-A so as to illustrate the path of the straps 10. With reference to FIG. 6, the shell 30 may have one or more slots 25, 27 disposed within a window 20 to allow the straps 10 to be accessed from the exterior of the base 1. The second portions 12 of the straps 10 may pass through the first slots 25 after being turned down the centerline Z of the base 1 by the locking assembly 51. By passing through the shell 30 to the exterior of the base 1, the straps 10 may be easier for a user to access and tighten. As shown in FIG. 1, the straps 10 may be disposed parallel to one another proximate the centerline Z of the base 1 to allow a user in a straight-on direction facing the front of the base opposite the button 15, to apply tension to the straps. In some embodiments, the straight-on direction corresponds to tensioning the straps 10 by pulling directly toward the front of the base parallel to the centerline Z. Parallel straps 10 along the centerline Z of the base 1 may be easier for a user to adjust and may facilitate better attachment of the base to the vehicle seat because the straps 10 may be actuated with either one or two hands and are accessible by the user from the straight-on direction.

In some embodiments, as shown in FIGS. 1, 6, and 7, the shell may define the window 20 in its upper surface. The window 20 may be in the form of one or more grooves, channels, or concave sections to allow the second portions 12 of the straps 10 to be accessible by the user but out of the way of the safety seat that is to be positioned over the top of the window and shell. In some alternative embodiments, the straps 10 may be run across a flat or convex surface of the safety seat with no window.

The user may pull the straps 10 via the window 20 in order to draw the straps through the locking assembly 51 and apply tension to hold the base securely to the vehicle seat. In some embodiments, the straps 10 may be accessible to a user in the window 20 from a straight-on direction relative to the base, as described above.

The straps 10 may be run into and/or through the window 20 via first 25 and second 27 slots (shown in FIG. 6), such that portions of the straps are accessible from the exterior of the base (e.g. from the upper side of the base). In some embodiments, two straps 10 may be run individually through the window 20 to allow the tension on each LATCH connector 5 to be individually and independently adjusted in order to securely attach the base 1 to the vehicle seat. In some alternative embodiments, the straps may be joined or overlapped so that both straps may be adjusted together in the window 20.

With reference to FIG. 6, excess portions 13, 14 of the straps 10, defined as portions of the straps extending past the first slots 25 away from the locking assembly 51, including an intermediate portion 14 and second end 13 of the straps, may then be run back through the shell 30 via one or more second slots 27. The straps 10 may be pulled or fed through the second slots 27 to collect the second portions 12 the straps and ensure that the second portion 12 of the straps does not interfere with the safety seat. In some embodiments, the straps 10 may only be accessible from the exterior of the shell 30 during the space from the first slots 25 to the second slots 27. In some embodiments, as shown in FIG. 1, the span of the straps 10 that is visible on the exterior of the shell 30 lies within the window 20.

In some embodiments, the slack of second portions 12 of the straps 10 may be pulled through the second slots 27 (shown in FIG. 6) by a tensioning assembly 145, which may be disposed on the opposite side of the window 20 from the locking assembly 51 along the straps 10. The tensioning assembly 145 (as shown in FIG. 6) and/or the window 20 may present a predetermined length of strap 10 in the window by removing slack from the second portions 12. By removing the slack, the window 20 may present the predetermined length of the strap 10 (e.g., approximately the length between the first 25 and second 27 respective slots) when the strap is not being accessed by a user. As explained in further detail below, when the strap 10 is being accessed by a user, additional strap may be pulled into the window 20 in order to facilitate applying tension to a first portion 11 of the strap in order to further secure the base of the safety seat to a vehicle seat.

The tensioning assembly 145 (shown in FIG. 6) may include a spring, elastic cable or strap, or any other mechanism designed to retract a second portion 12 of the straps 10. The tensioning assembly 145 may be attached to the straps 10 at any point along the second portion 12 and may be configured to automatically take up any slack in the second portion of one or more straps. As discussed above, the straps 10 may alternatively be joined or overlapped either before or after the locking assembly 51 to adjust both straps simultaneously.

In some embodiments, with reference to FIGS. 6 and 7, the retracting or tensioning assembly 145 may be used to take up slack in the second portion 12 of the straps 10 to prevent the second portions from interfering with the use of the safety seat. In some embodiments, as shown in FIGS. 6 and 7, the second ends 13 of the second portions 12 of the straps 10 may be anchored within the base 1, and the tensioning assembly 145 may apply tension to an intermediate portion 14 of the second portion 12. As shown in FIG. 6, the tensioning assembly 145 may include a tensioning clip 140 attached to or looped around the intermediate portion 14 of the second portion 12 of the straps 10. In some embodiments the tensioning assembly 145 may include a tensioning member, such as an elastic strap 147. As shown in FIGS. 6 and 7, the elastic strap 147 may be connected to the tensioning clip 140 to apply tension to the second portion 12 of the straps 10. The tensioning clip 140 may be attached to one end 148 of the elastic strap 147, while the intermediate portion 14 of the straps 10 slidably passes through the tensioning clip in order to maintain tension on the straps 10.

The elastic strap 147 may be anchored at one end 149 within the base 1. For example, as shown in FIGS. 6 and 7, the end 149 of the elastic strap 147 may be attached to a clip 155 that is anchored either to the rigid support plate 60 directly or indirectly via the second end 13 of the second portion 12 of the strap 10. In some embodiments, the elastic strap may loop around a stationary rod 150 so that the elastic may have more distance over which to elongate. The tensioning assembly 145 may include one elastic strap 147 and one tensioning clip 140 for the one or more straps 10, or the tensioning assembly may include a separate elastic strap 147 and tensioning clip 140 for each strap 10. In some embodiments, the tensioning assembly 145 may also assist with applying tension to the first portion 11 of the straps 10 by maintaining a steady tension on the entire straps.

As shown in FIG. 7, the user may tighten the straps 10 by lifting upward and/or forward from the base 1. Pulling the straps 10 may cause the straps to slide through the locking assembly 51 and apply tension to the first portion 11. Once the user releases the straps 10, loops of excess strap are left on the exterior of the shell from the section of strap that was pulled from the first portion. The tensioning assembly 145 then automatically takes up the slack by pulling the excess portions 13, 14 of strap in the loops through the second slots 27 until the straps are substantially tight across the window. In this embodiment, the tensioning assembly 145 allows the second portion 12 of the strap 10 to be pulled back through the second slots 27 if the user needs more material to grip the straps, but each time the straps are released, the slack is removed from the strap 10 by the tensioning assembly 145 so that the slack does not interfere with the operation of the safety seat.

In some embodiments, the second ends 13 of the straps 10 may be attached directly to and move with the tensioning assembly 145. In other embodiments, the second ends 13 of the straps 10 may be anchored to the base 1, as discussed above, with the tensioning assembly 145 applying tension to the intermediate section 14 of the second portions 12 of the straps. In some embodiments, a first end 148 of the elastic strap 147 may be attached to the tensioning clip 140 and a second end 149 of the elastic strap may be attached to the base 1. The second portion 149 of the elastic strap may additionally or alternatively be anchored to the second end 13 of the second portion 12 of the strap 10.

With reference to FIGS. 6 and 7, the second end 13 of the second portion 12 of the strap 10 may be anchored to the support plate 60 at a hook portion 120 (shown in FIG. 4) of the plate. With reference to FIG. 4, the hook portion 120 may have one or more prongs 125 configured to receive the second end 13 of the strap 10. The second end 13 of each strap 10 may be looped around the prongs 125 of the hook portion 120 or may be secured to the support plate 60 using any other attachment mechanism. In some embodiments, the elastic straps 147 may also be looped around the prongs 125 or may be attached to their own set of prongs. In some other embodiments, the elastic straps 147 may be attached to the second ends 13 of the straps 10 proximate the prongs 125, such as with a clip through the loops in the second ends 13 of the straps or on pins attached to the straps.

As discussed above, the support plate 60 may be used to attach to and hold one or more of the components of the base 1. For example, the support plate 60 may connect to one or more of the locking clips 55, shell 30, anchors 45, actuator plate 65, second ends 13 of the straps 10, and/or elastic straps 147, as described above. With reference to FIG. 4, in addition to the features detailed herein, the support plate 60 may attach to the shell 30 at one or more attachment holes 137, and the support plate may attach to the anchors 45 at a pair of corresponding holes 135.

The support plate 60 may be made of a substantially rigid material, including, but not limited to, steel or other types of metal or hard plastics. In the event of a crash, the support plate 60 may be designed to transfer the energy from an unexpected movement of the safety seat into the vehicle seat. The support plate 60 may be in direct communication with the anchors 45 that attach to the safety seat in order to receive the force from the safety seat. The support plate 60 may also be in direct communications with the first portions 11 of the straps 10 pulled tight over grooves 115 in the support plate and held by the locking clips 55. In some embodiments, attaching the various structural components of the base 1 to the support plate 60 improves the stability and safety of the safety seat by efficiently transferring energy through the base 1 without applying substantial stress to the weaker components of the base. Limiting the number of components that must bear up to force also decreases the manufacturing cost of the base. In some embodiments, the support plate 60 may be bent at several points to connect with the shell 30 and increase the strength of the plate. The support plate 60 may also have several strengthening ridges 130 formed therein to increase the strength of the plate.

The support plate 60 may also attach to a bottom shell (not shown) covering the lower side of the base 1. The bottom shell may additionally or alternatively be configured to attach to the shell 30 in order to provide a substantially smooth surface for the bottom of the base. In some embodiments, the base 1 may include an adjustable foot (not shown) near the rear side of the support plate 60 for raising or lowering rear portion of the base to ensure the safety seat is held level on the vehicle seat.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purpose of limitation.

What is claimed is:

1. A base for a safety seat configured to be anchored to a vehicle seat, the base comprising:
   a shell defining a cavity therein;
   a locking assembly disposed within the cavity;
   one or more straps defining a first end and a second end, wherein the one or more straps extend through the locking assembly,
   wherein the locking assembly is configured to releasably engage the one or more straps to secure the safety seat to the vehicle seat, wherein the first end and the second end of each of the one or more straps are configured to be disposed on opposing sides of the locking assembly;
   a connector attached to the first end of each the one or more straps, wherein each of the one or more straps defines a first portion extending from the connector to the locking assembly, and wherein the connectors are configured to engage a vehicle seat; and
   a tensioning assembly supported by the shell, wherein the tensioning assembly is configured to apply a tension to a second portion of each of the one or more straps, wherein the second portion extends from the locking assembly to the second end of the one or more straps,
   wherein the one or more straps comprise a first strap and a second strap, wherein the locking assembly is configured to receive the first portion of the first strap and the first portion of the second strap from opposing sides of the base, and wherein the second portion of the first strap and the second portion of the second strap extending from the locking assembly to the second ends of the first strap and second strap are disposed parallel to a centerline of the base.

2. The safety seat of claim 1, further comprising a window defined by an upper surface of the shell of the base such that the second portions of the one or more straps are at least partially accessible via the window.

3. The safety seat of claim 2, wherein the window is configured to present a predetermined length of the second portions of the one or more straps for access by a user.

4. The safety seat of claim 1, wherein accessing the second portions of the one or more straps is configured to increase the tension in the first portions of the one or more straps to further secure the base to the vehicle, and wherein the tensioning assembly is configured to reduce slack in the second portions of the one or more straps.

5. The safety seat of claim 1, wherein the second end of at least one of the second portions is fixedly attached within the base such that the tensioning assembly applies a tension to an intermediate portion of the at least one second portion.

6. The safety seat of claim 1, wherein the locking assembly further comprises a rigid support plate, wherein the rigid support plate is configured to engage the shell of the base.

7. The safety seat of claim 1, wherein the tensioning assembly comprises one or more elastic straps.

8. A base for a safety seat configured to be anchored to a vehicle seat, the base comprising:
   a shell defining a cavity therein;
   a locking assembly disposed within the cavity;
   one or more straps defining a first end and a second end, wherein the one or more straps extend through the locking assembly,
   wherein the locking assembly is configured to releasably engage the one or more straps to secure the safety seat to the vehicle seat, wherein the first end and the second end of each of the one or more straps are configured to be disposed on opposing sides of the locking assembly; and a connector attached to the first end of each of the one or more straps, wherein each of the one or more straps defines a first portion extending from the connector to the locking assembly, and wherein the connectors are configured to engage a vehicle seat, wherein the one or more straps comprise a first strap and a second strap, wherein the locking assembly is configured to receive the first portion of the first strap and the first portion of the second strap from opposing sides of the base, and wherein the second portion of the first strap and the second portion of the second strap extending from the locking assembly to the second ends of the first strap and second strap are disposed parallel to a centerline of the base.

9. The safety seat of claim 8, further comprising a window defined by an upper surface of the shell of the base such that the second portions of the first strap and the second strap are at least partially accessible via the window.

10. The safety seat of claim 9, wherein the window is configured to present a predetermined length of the second portions of first strap for access by a user.

11. The safety seat of claim 8, further comprising a tensioning assembly supported by the shell, wherein the tensioning assembly is configured to apply a tension to the second portion of the first strap and the second portion of the second strap.

12. A method of manufacturing a base for a safety seat, the method comprising:
   providing a shell having a cavity defined therein;
   connecting a locking assembly to the shell within the cavity;
   extending one or more straps defining a first end and a second end through the locking assembly,
   releasably engaging the locking assembly with the one or more straps, wherein the first end and the second end of each of the one or more straps are configured to be disposed on opposing sides of the locking assembly;
   attaching a connector to the first end of each of the one or more straps, wherein each of the one or more straps defines a first portion extending from the connector to the locking assembly, wherein the connectors are configured to engage a vehicle seat; and
   attaching a tensioning assembly to second portions of each of the one or more straps, wherein the second portion extends from the locking assembly to the second end of the one or more straps, and wherein the tensioning assembly is configured to apply a tension to the second portions of each of the one or more straps,
   wherein the one or more straps comprise a first strap and a second strap, wherein the locking assembly is configured to receive a first portion of the first strap and a first portion of the second strap from opposing sides of the base, and wherein a second portion of the first strap and a second portion of the second strap extending from the locking assembly to the second ends of the first and second strap are disposed parallel to a centerline of the base.

13. The method of claim 12, further comprising disposing the one or more straps through one or more slots in the shell into a window defined by an upper surface of the shell of the base such that the second portions of the one or more straps are at least partially accessible via the window.

14. The method of claim 12, wherein the tensioning assembly comprises at least one elastic strap, wherein attaching the tensioning assembly further comprises connecting a first end of the at least one elastic strap to an intermediate portion of the second portion of the one or more straps such that the tensioning assembly is configured to apply a tension to the intermediate portion of the second portion of the one or more straps.

15. The method of claim 14, wherein attaching the tensioning assembly further comprises connecting a second end of the at least one elastic strap to the base such that the second end is fixed relative to the base.

16. The method of claim 14, wherein the second end of at least one of the one or more straps is fixedly attached within the base.

17. The method of claim 14, wherein the locking assembly further comprises a rigid plate such that connecting the locking assembly to the shell further comprises connecting the rigid support plate to the shell within the cavity.

18. A base for a safety seat configured to be anchored to a vehicle seat, the base comprising:
   a shell defining a cavity therein;
   a locking assembly disposed within the cavity;
   one or more straps defining a first end and a second end, wherein the one or more straps extend through the locking assembly,
   wherein the locking assembly is configured to releasably engage the one or more straps to secure the safety seat to the vehicle seat, wherein the first end and the second end of each of the one or more straps are configured to be disposed on opposing sides of the locking assembly, wherein the locking assembly defines one or more releasable, one-way locks configured to allow the one or more straps to be pulled through the locking assembly in a tensioning direction, wherein each of the one or more releasable, one-way locks comprise at least two locks configured to be actuated substantially simultaneously by a common actuator plate;
   a connector attached to the first end of each the one or more straps, wherein each of the one or more straps defines a first portion extending from the connector to the locking assembly, and wherein the connectors are configured to engage a vehicle seat; and
   a tensioning assembly supported by the shell, wherein the tensioning assembly is configured to apply a tension to a second portion of each of the one or more straps, wherein the second portion extends from the locking assembly to the second end of the one or more straps wherein the locking assembly defines one or more releasable, one-way locks configured to allow the one or more straps to be pulled through the locking assembly in a tensioning direction.

* * * * *